Patented May 23, 1950

2,508,499

UNITED STATES PATENT OFFICE 2,508,499

AMINO CYCLOHEXYL ETHERS

John W. Cusic, Skokie, Ill., assignor to G. D. Searle & Co., Skokie, Ill., a corporation of Illinois No Drawing. Application February 1, 1947, Serial No. 725,969

8 Claims. (Cl. 260—293)

This invention relates to certain amino-cyclohexyl ethers of benzohydrol, its alkyl, alkoxy and halogen substitution products, and of 9-fluorenol. The amino groups, which may be attached to any carbon atom of the cyclohexyl ring other than the one to which the ether linkage is attached, are mono- or dialkylamino, N-piperidino, and N-morpholino radicals. All of the basic ethers contemplated within this invention are included in the formula

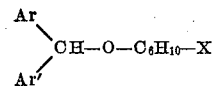

in which Ar and Ar' each represent a phenyl, an alkyl phenyl, an alkoxy phenyl or a halogenated phenyl group, or taken together may constitute a 9-fluoryl group, the $C_6H_{10}$ radical represents a cyclohexane residue to which the oxygen atom and the X group may be linked on any two different carbon atoms, and in which X represents a monoalkylamino, a dialkylamino, a N-piperidino, or a N-morpholino group. These basic ethers generally are oils which are soluble in the common organic solvents and insoluble in water, and which in most instances can be distilled without decomposition in a good vacuum. They form salts with mineral and with organic acids which in most instances are white crystalline solids readily soluble in water. While the valuable therapeutic properties of these compounds are common to both the free basic ethers and the salts thereof, the salts constitute a more convenient form in which to use these amino ethers because of their solid nature and water solubility, and it is to be understood that the appended claims include these ethers both as free bases and in the form of salts thereof.

The ethers of this invention may conveniently be prepared by causing an amino cyclohexyl halide to react with benzohydrol, its alkyl or alkoxy or halogen substitution products, or 9-fluorenol in the presence of solid sodium hydroxide and at moderately elevated temperatures. The reaction mixture is poured into water and the amino ether extracted as illustrated in the following examples.

Example 1

Thirty-five grams of benzohydrol and 30 gm. of 2-dimethylamino cyclohexyl chloride are gently melted together, and 35 gm. of powdered sodium hydroxide is added all at once. A vigorous reaction sets in; when this has moderated, the mixture is heated on a steam bath for several hours. At the end of this time, the mixture is poured into an excess of dilute hydrochloric acid, and the acid solution extracted with ether to remove neutral by-products. The aqueous solution is then made strongly alkaline, and the liberated base extracted with ether, benzene or other solvent. This solution is dried, the solvent removed and the residue distilled in a vacuum. The benzohydryl 2 - dimethylaminocyclohexyl ether thus obtained boils at 190° centigrade at 2 millimeters pressure. The free base may be converted to a salt by adding an equivalent portion of an alcoholic solution of the desired acid to a solution of the base in dry ether. Thus prepared, the hydrochloride of the ether in this example melts at 148–150° C. after recrystallization from methyl ethyl ketone.

The reaction illustrated by the above example is quite general in its application to the preparation of the ethers of this invention. By the use of substituted benzohydrols, such as the 2-methyl, 2,4-dimethyl, 4,4' - dimethyl, 2 - methyl - 5 - isopropyl, 2, 3, or 4-chloro, 4,4'-dichloro, 2-ethoxy, 4-methoxy, or 4,4-dimethoxy derivatives, the corresponding substituted benzohydryl ethers are obtained in exactly the same manner as described for benzohydrol in the above example.

Example 2

A mixture of 35 grams of 2-piperidinocyclohexanol and 21 gm. of anhydrous sodium carbonate are heated to about 100° C. with thorough agitation, and a solution of 50 gm. of diphenylmethyl bromide in just sufficient benzene to cause it to remain liquid is slowly added. The temperature is gradually raised to 125° C. during the addition, allowing the benzene to boil off during the evolution of carbon dioxide. The reaction mixture is maintained at this temperature for several hours, cooled, washed with water to remove sodium salts, and the oily layer extracted with ether. The ether solution is extracted with dilute hydrochloric acid, from which solution the crude free benzohydryl 2-piperidino-cyclohexyl ether is liberated by addition of caustic alkali. This is best recovered by extracting with ether, drying the ether solution over solid sodium hydroxide, and subsequently removing the solvent. It may be further purified by vacuum distillation, boiling at 220° C. at 2 mm. pressure. It may be converted to a salt as described in Example 1. The hydrochloride thus prepared melts at 187°–189° C.

The reaction illustrated in Example 2 is also quite general, and may be used to prepare any of the aminocyclohexyl ethers contemplated in this invention merely by replacing the diphenylmethyl bromide with an equivalent quantity of a substituted diphenylmethyl bromide or with 9-bromofluorene, or by replacing the 2-piperidino-cyclohexanol with an equivalent quantity of a different aminocyclohexanol.

Many of the substituted benzohydrols needed to prepare the ethers of this invention according to Example 1 are known in the prior art; they are in general readily obtained by the reduction of the corresponding benzophenones. Similarly, many of the substituted diphenylmethyl bromides contemplated in Example 2 have been previously described. They are readily available either by bromination of the corresponding diphenylmethane, or by replacement of the hydroxyl group in the corresponding substituted benzohydrol by a bromine atom in any of several well known manners.

While 2-dimethylamino or 2-piperidino cyclohexanol, (or the corresponding cyclohexyl chloride) have been specified in the above examples, they may be replaced by a variety of other aminocyclohexanols or aminocyclohexyl halides as described below to yield the ethers previously indicated as being contemplated within this invention. These aminocyclohexanols are conveniently prepared by causing a chlorocyclohexanol to react with a primary or secondary amine or with piperidine or morpholine. Thus with 2-chlorocyclohexanol, monomethylamine will yield the corresponding 2-monomethylamino cyclohexanol, dimethylamine will yield 2-dimethylamino cyclohexanol, piperidine will yield 2-piperidino cyclohexanol, and morpholine will yield 2-morpholino cyclohexanol. Similarly higher alkyl amines, such as mono- or di-ethyl, propyl, butyl, or hexyl amines will yield the corresponding cyclohexanols. When 3- or 4-chlorocyclohexanol is used in place of 2-chlorocyclohexanol, the corresponding 3- or 4-aminocyclohexanols will likewise be formed. Any of these aminocyclohexanols may be used in molecularly equivalent quantities in place of the 2-dimethylamino cyclohexanol specified in Example 2 to produce the aminocyclohexyl ethers of this invention. Further, these aminocyclohexanols may be converted to the corresponding aminocyclohexyl chlorides by the action of thionyl chloride in an inert solvent. Any of these aminocyclohexyl chlorides may be successfully substituted for the 2-dimethylamino cyclohexyl chloride specified in Example 1 to yield the aminocyclohexyl ethers of this invention.

The aminocyclohexyl ethers of this invention are useful in therapeutics, particularly as spasmolytic and as anti-histamine agents. When tested on isolated smooth-muscle strips for their ability to relax spasms induced either by acetylcholine or by barium ions, representative compounds from the ethers of this invention have exerted a powerful relaxing effect. Thus, for instance, the 2-piperidinocyclohexyl ether of benzohydrol produced relaxation of spasms induced by either of the above mentioned agents with approximately the same potency, which potency is comparable in magnitude with that displayed by some of the most powerful synthetic spasmolytic agents heretofore disclosed.

Similarly the aminocyclohexyl ethers of this invention are potent as histamine antagonists and anti-allergic substances. Animals treated with one of these ethers prior to exposure to an atmosphere filled with a finely-divided mist of dilute histamine solution of sufficient concentration to be fatal to untreated animals, are normally able to recover from the bronchial congestion resulting from such exposure. Animals previously sensitized to a foreign protein and then treated with one of the compounds of this invention show a high rate of survival from the effects of a subsequent administration of a dose of the sensitizing protein which produces uniformly fatal doses in untreated animals.

As will be expected, the aminocyclohexyl ethers of this invention differ among themselves not only in potency as therapeutic agents, but also in acute toxicity. This toxic level is sufficiently high, however, that a desirably wide margin of safety exists between effective and toxic doses, so that these compounds may be safely and effectively used as therapeutic agents.

The invention is defined by the appended claims.

I claim:

1. Amino cyclohexyl ethers of the formula $$\begin{array}{c}Ar\\ \phantom{Ar}\diagdown\\ \phantom{AAA}CH-O-C_6H_{10}-X\\ \phantom{AA}\diagup\\ Ar'\end{array}$$

in which Ar and Ar' each represent a radical chosen from the group consisting of phenyl, alkyl-substituted phenyl, alkoxy-substituted phenyl, and halogen-substituted phenyl; in which the $C_6H_{10}$ is a cyclohexane residue to which the oxygen atom and the X group may be attached on any two different carbon atoms; and in which X represents a radical chosen from the group consisting of monoalkylamino, dialkylamino, N-piperidino, and N-morpholino.

2. Amino cyclohexyl ethers of the formula $$\begin{array}{c}Ar\\ \phantom{Ar}\diagdown\\ \phantom{AAA}CH-O-CH-CH-X\\ \phantom{AA}\diagup\phantom{AAAA}|\phantom{AAAA}|\\ Ar'\phantom{AAAA}CH_2\phantom{AA}CH_2\\ \phantom{AAAAAAA}\diagdown\phantom{AA}\diagup\\ \phantom{AAAAAAAA}CH_2-CH_2\end{array}$$

in which Ar and Ar' each represent a radical chosen from the group consisting of phenyl, alkyl-substituted phenyl, alkoxy-substituted phenyl, and halogen-substituted phenyl; and in which X represents a radical chosen from the group consisting of monoalkylamino, dialkylamino, N-piperidino, and N-morpholino.

3. Amino cyclohexyl ethers of the formula $$\text{(diphenylmethyl)}CH-O-C_6H_{10}X$$

in which the $C_6H_{10}$ is a cyclohexane residue to which the oxygen atom and the X group may be attached on any two different carbon atoms; and in which X represents a radical chosen from the group consisting of monoalkylamino, dialkylamino, N-piperidino, and N-morpholino.

4. Amino cyclohexyl ethers of the formula $$\text{(diphenylmethyl)}CH-O-CH-CH-X$$

in which X represents a radical chosen from the group consisting of monoalkylamino, dialkylamino, N-piperidino, and N-morpholino.

5. Benzohydryl 2 - dimethylaminocyclohexyl ether, whose formula is

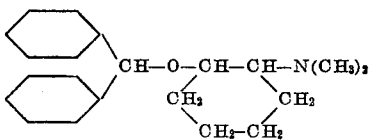

6. Benzohydryl 2-piperidinocyclohexyl ether, whose formula is

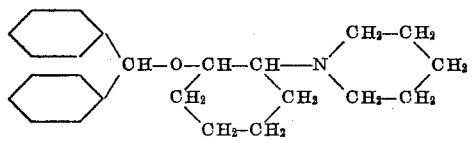

7. Amino cyclohexyl ethers of the formula

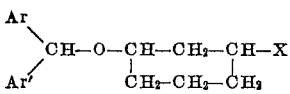

in which Ar and Ar' each represent a radical chosen from the group consisting of phenyl, alkyl-substituted phenyl, alkoxy-substituted phenyl, and halogen-substituted phenyl; and in which X represents a radical chosen from the group consisting of monoalkylamino, dialkylamino, N-piperidino, and N-morpholino.

8. Amino cyclohexyl ethers of the formula

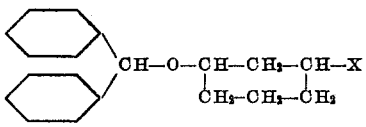

in which X represents a radical chosen from the group consisting of monoalkylamino, dialkylamino, N-piperidino, and N-morpholino.

JOHN W. CUSIC.

REFERENCES CITED

The following references are of record in the file of this patent:

UNITED STATES PATENTS

| Number | Name | Date |
| --- | --- | --- |
| 1,978,539 | Klarer et al. | Oct. 30, 1934 |
| 2,397,799 | Martin | Apr. 2, 1946 |
| 2,421,714 | Rieveschl | June 3, 1947 |
| 2,437,711 | Rieveschl | Mar. 16, 1948 |
| 2,443,796 | Martin et al. | June 22, 1948 |

OTHER REFERENCES

Loew: J. Pharmacol et al., vol. 83, Feb. 1945, pp. 120–129.